UNITED STATES PATENT OFFICE.

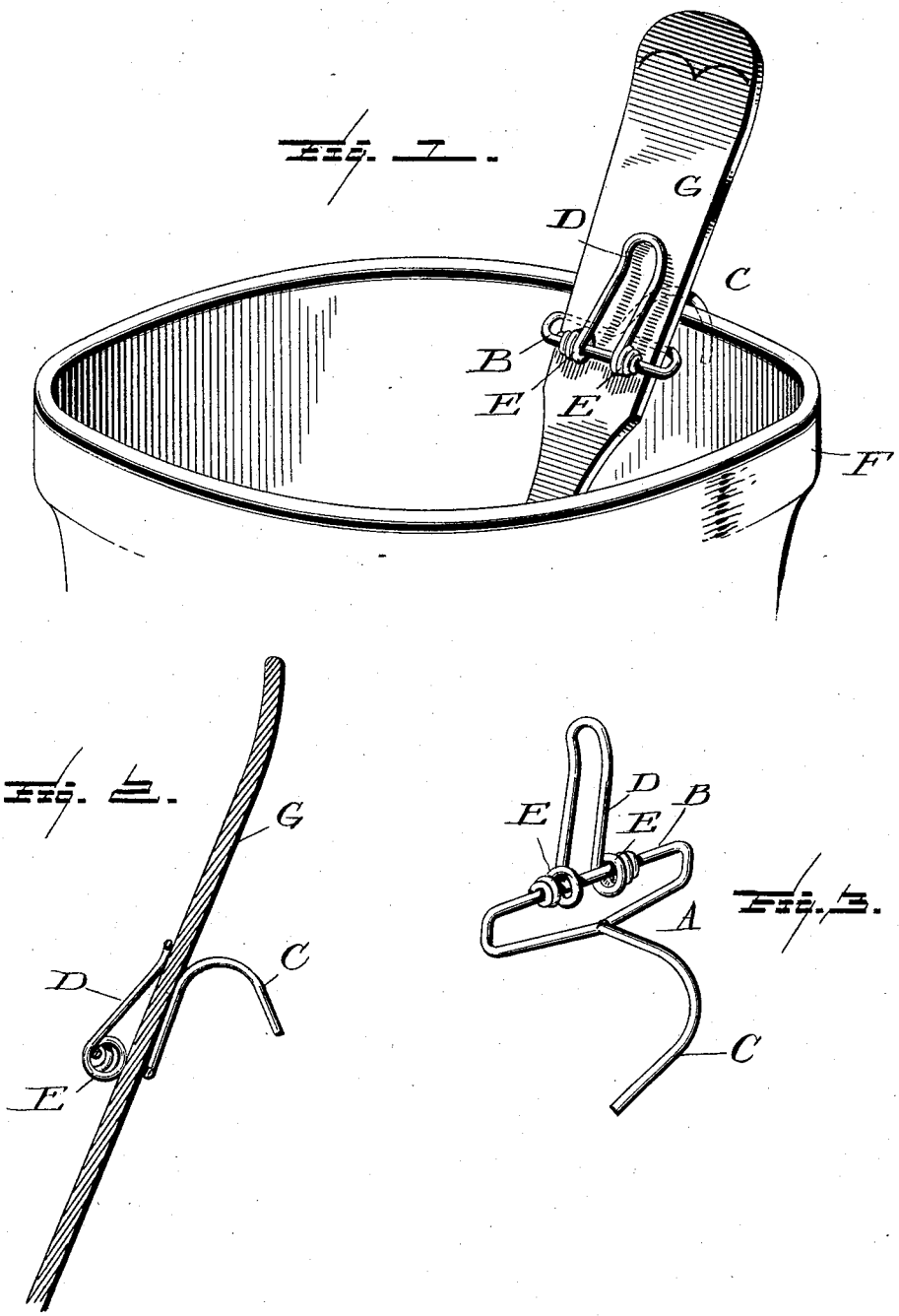

ELBERT D. MILKS, OF MACHIAS, NEW YORK.

SPOON-HOLDER.

SPECIFICATION forming part of Letters Patent No. 637,008, dated November 14, 1899.

Application filed September 6, 1899. Serial No. 729,633. (No model.)

*To all whom it may concern:*

Be it known that I, ELBERT D. MILKS, a citizen of the United States, residing at Machias, in the county of Cattaraugus and State of New York, have invented certain new and useful Improvements in Spoon-Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in spoon-holders, and it more specifically relates to that class of spoon-holders which are designed for use in preventing spoons or ladles, when used in pots or kettles, from falling into the vessel in which they are used.

The invention has for its object the provision of a simple and inexpensive and at the same time efficient device of the character mentioned which may be quickly and easily locked in place upon the handle of the spoon, the device being provided with a hooked portion adapted to engage the upper rim of the pot, kettle, or other vessel in which the spoon is used and by the engagement of the hook to effectually prevent the possibility of the spoon falling down into the vessel.

To this end and to such others as the invention may pertain the same consists in the novel construction and in the peculiar combination, arrangement, and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, and in which drawings—

Figure 1 is a perspective view of the upper edge or rim of a pot or kettle, showing my improved form of spoon-holder attached to the handle of a spoon and held in place upon the rim of the vessel. Fig. 2 is a longitudinal central section through a spoon-handle with my spoon-holder attached thereto. Fig. 3 is an enlarged detail in perspective of the spoon-holder detached from the spoon.

Reference now being had to the details of the drawings by letter, A designates the spoon-holder, consisting of a body portion or elongated loop B, formed of a single piece of wire, one end of the wire being bent outwardly from the longitudinal center of the lower portion of the loop B and being bent downward to form a hook C.

D is a cam-lever formed from a single piece of wire, the ends of which are coiled to form cams E E, which cams are sleeved upon the upper bar of the loop B.

The operation of the device is simple and will be readily understood. In Fig. 1 of the drawings I have shown a pot or kettle F, to the rim of which is held a spoon G by means of my device. It will be noted that in attaching the device to the handle of the spoon it is simply necessary to pass the handle of the spoon through the loop B of the device, when by turning the cam-lever D the device will be securely locked in place, when by hooking the part or hook C over the edge of the vessel in which the spoon is to be held the spoon will be prevented from falling into the vessel.

Having thus described my invention, what I claim to be new, and desire to secure by Letters Patent, is—

A spoon-holder, consisting of a wire A formed into a loop B, one end of said wire being extended and bent into a hook C, the tongue D formed by bending a wire upon itself and having its ends coiled to form cams and journaled on said loop as shown and described.

In testimony whereof I affix my signature in presence of two witnesses.

ELBERT D. MILKS.

Witnesses:
 D. EARL TILDEN,
 JOHN CRADDUCK.